(12) United States Patent
Rahmati et al.

(10) Patent No.: US 9,258,764 B2
(45) Date of Patent: Feb. 9, 2016

(54) SYSTEM AND METHODS FOR ANONYMOUS CROWDSOURCING OF NETWORK CONDITION MEASUREMENTS

(71) Applicant: Broadcom Corporation, Irvine, CA (US)

(72) Inventors: Ahmad Rahmati, San Carlos, CA (US); Dutt H. Kalapatapu, Santa Clara, CA (US); Kamesh Medapalli, San Jose, CA (US); Farouk Belghoul, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 81 days.

(21) Appl. No.: 14/167,615

(22) Filed: Jan. 29, 2014

(65) Prior Publication Data

US 2014/0211648 A1     Jul. 31, 2014

Related U.S. Application Data

(60) Provisional application No. 61/758,047, filed on Jan. 29, 2013.

(51) Int. Cl.
| | | |
|---|---|---|
| *H04W 24/00* | (2009.01) | |
| *H04W 80/04* | (2009.01) | |
| *H04W 48/12* | (2009.01) | |
| *H04W 48/18* | (2009.01) | |

(52) U.S. Cl.
CPC .............. *H04W 48/12* (2013.01); *H04W 48/18* (2013.01)

(58) Field of Classification Search
CPC ...... H04W 24/00; H04W 80/04; H04W 84/12; H04W 88/08; H04L 43/50
See application file for complete search history.

(56) References Cited

U.S. PATENT DOCUMENTS

| | | | |
|---|---|---|---|
| 2012/0093031 A1* | 4/2012 | Wang et al. .................... | 370/254 |
| 2013/0070584 A1* | 3/2013 | Hutchison et al. ............ | 370/216 |
| 2013/0070594 A1* | 3/2013 | Garcia Martin et al. ...... | 370/235 |
| 2013/0265985 A1* | 10/2013 | Salkintzis ...................... | 370/331 |
| 2013/0308445 A1* | 11/2013 | Xiang et al. ................... | 370/230 |
| 2014/0050320 A1* | 2/2014 | Choyi et al. ................... | 380/270 |
| 2014/0092731 A1* | 4/2014 | Gupta ............................. | 370/229 |
| 2014/0199983 A1* | 7/2014 | Bergstrom et al. ............ | 455/418 |
| 2014/0200000 A1* | 7/2014 | Jin et al. ..................... | 455/435.2 |
| 2014/0204745 A1* | 7/2014 | Nuss ............................. | 370/232 |
| 2014/0213256 A1* | 7/2014 | Meylan et al. ................ | 455/436 |
| 2014/0214914 A1* | 7/2014 | Alex et al. ..................... | 709/201 |

* cited by examiner

*Primary Examiner* — Andrew Lee
(74) *Attorney, Agent, or Firm* — Sterne, Kessler, Goldstein & Fox P.L.L.C.

(57) ABSTRACT

A communication device and method for crowdsourcing of information from one or more communication devices. The crowdsourced information can be defined by one or more parameters defined in an operational framework. The operational framework can be, for example, an Access Network Discovery and Selection Function (ANDSF) framework. The operational framework can include, for example, positional and/or movement information of the communication device(s), a signal quality of a communication network, a visibility duration of a communication network, data rate information of a communication network, and/or quality of service (QoS) information of a communication network.

21 Claims, 7 Drawing Sheets

SYSTEM AND METHODS FOR ANONYMOUS CROWDSOURCING OF NETWORK CONDITION MEASUREMENTS

CROSS REFERENCE TO RELATED APPLICATIONS

This patent application claims the benefit of U.S. Provisional Patent Application No. 61/758,047, filed Jan. 29, 2013, entitled "Anonymous Crowdsourcing Of Network Condition Measurements For ANDSF," which is incorporated herein by reference in its entirety.

BACKGROUND

Field

This application relates generally to wireless communications, including the crowdsourcing of network information and/or contextual information by one or more mobile devices within a communication environment.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specification and International Mobile Telecomunnications-2000 (IMT-2000) standard, all of which are incorporated by reference in their entirety. Further, although exemplary embodiments are described with reference to LTE, the more generic terms "mobile device" and "base station" are used herein except where otherwise noted to refer to the LTE terms "User Equipment (UE)" and "eNodeB/eNB," respectively.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) WLAN (IEEE 802.11), Bluetooth, Near-field Communication (NFC) (ISO/IEC 18092), ZigBee (IEEE 802.15.4), and/or Radio-frequency identification (RFID), to provide some examples. These various standards and/or protocols are each incorporated by reference in their entirety.

Figure 1:
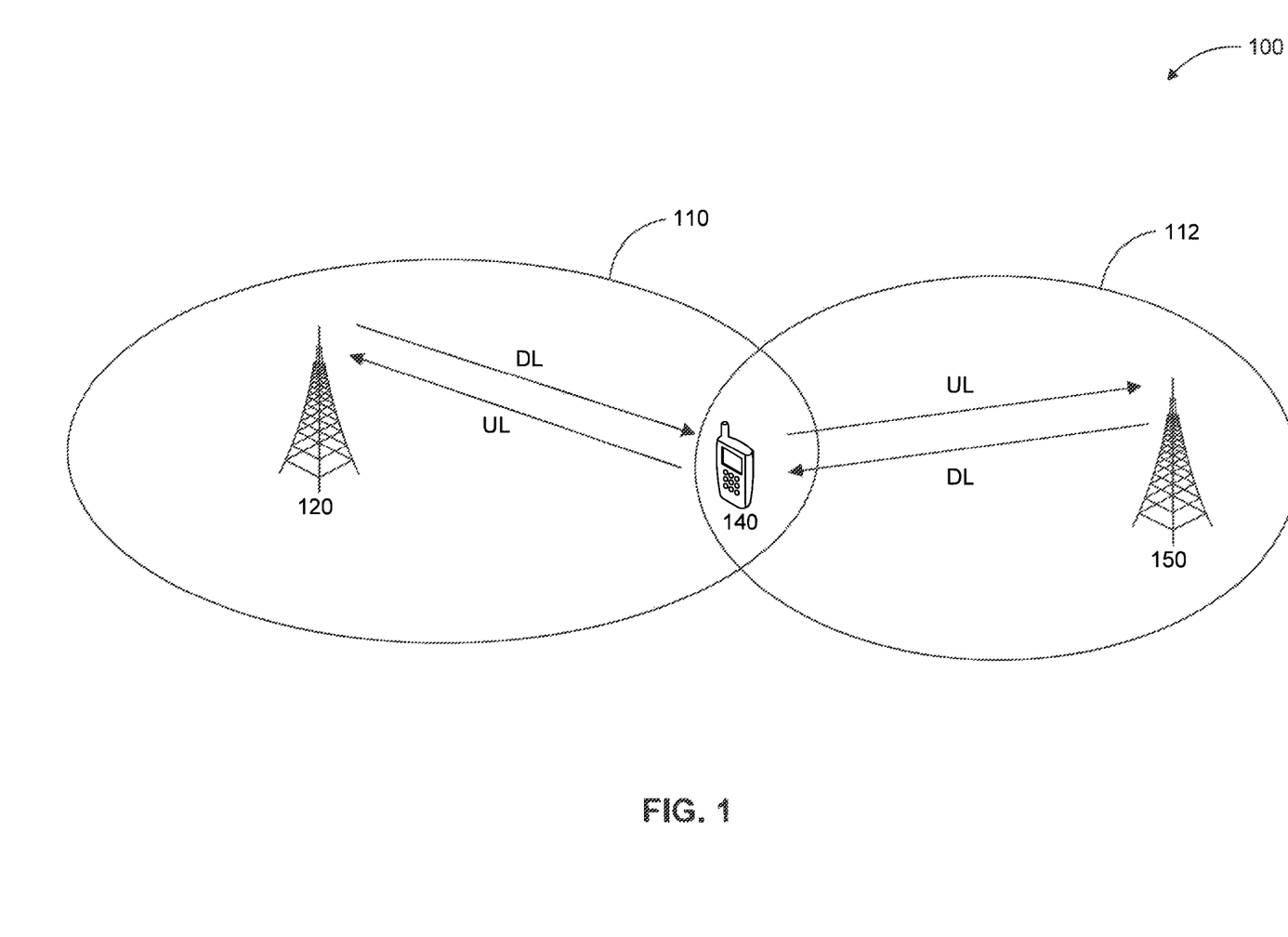
FIG. 1 illustrates an example network environment.

FIG. 1 illustrates an example communication environment 100 that includes a base station 120, a mobile device 140, and an access point (AP) 150. The base station 120, mobile device 140, and AP 150 each include suitable logic, circuitry, and/or code that is configured to communicate via one or more wireless technologies, and the mobile device 140 is further configured to support co-existing wireless communications. The mobile device 140 can include, for example, a transceiver having suitable logic, circuitry, and/or code that is configured to transmit and/or receive wireless communications via one or more wireless technologies within the communication environment 100. The base station 120 and AP 150 each include suitable logic, circuitry, and/or code that is configured to: (1) receive one or more wired communications via one or more well-known wired technologies (e.g., within a core (backhaul) network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include one or more wireless protocols discussed above.

The mobile device 140 can be configured to communicate with the base station 120 in a serving cell or sector 110 of the communication environment 100, and/or to communicate with the access point (AP) 150 in a wireless local area network (WLAN) 112. For example, the mobile device 140 receives signals on one or more downlink (DL) channels and transmits signals to the base station 120 and/or the AP 150 on one or more respective uplink (UL) channels.

In an exemplary embodiment, the base station 120 includes suitable logic, circuitry, and/or code that is configured for communications conforming to 3GPP's Long-Term Evolution (LTE) specification (e.g., the base station is an LTE base station), the AP 150 includes suitable logic, circuitry, and/or code that is configured for communications conforming to IEEE's 802.11 WLAN specification (e.g., the AP 150 is a WLAN access point), and the mobile device 140 includes suitable logic, circuitry, and/or code that is configured for communications conforming to 3GPP's LTE specification and IEEE's 802.11 WLAN specification. That is, the mobile device 140 is configured to wirelessly communicate with the base station 120 utilizing 3GPP's LTE specification and with the AP 150 utilizing IEEE's 802.11 WLAN specification. Here, the serving cell or sector 110 is an LTE serving cell or sector and the WLAN 112 is a WLAN utilizing the 802.11 WLAN specification.

Examples of the mobile device 140 include (but are not limited to) a mobile computing device—such as a laptop computer, a tablet computer, a mobile telephone or smartphone, a "phablet," a personal digital assistant (PDA), mobile media player, and the like; and a wearable computing device—such as a computerized wrist watch or "smart" watch, computerized eyeglasses, and the like. In some embodiments, the mobile device 140 may be a stationary device, including, for example, a stationary computing device—such as a personal computer (PC), a desktop computer, a computerized kiosk, an automotive/aeronautical/maritime in-dash computer terminal, and the like.

Figure 2:
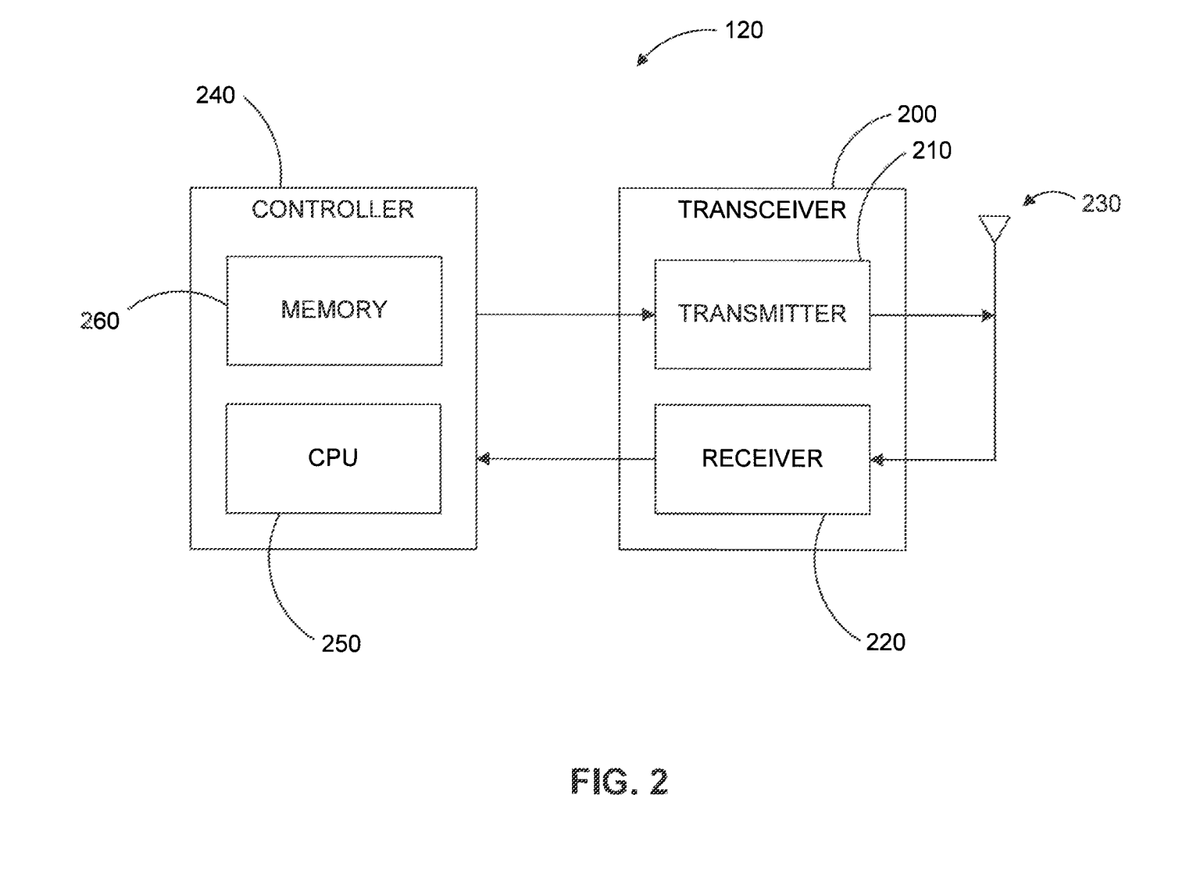
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 communicatively coupled to a controller 240.

The transceiver 200 includes suitable logic, circuitry, and/or code that is configured to transmit and/or receive wireless communications via one or more wireless technologies within the communication environment 100. In particular, the transceiver 200 can include a transmitter 210 and a receiver 220 that have suitable logic, circuitry, and/or code configured to transmit and receive wireless communications, respectively, via one or more antennas 230. Those skilled in the relevant art(s) will recognize that the processes for transmitting and/or receiving wireless communications can include (but are not limited to) digital signal processing, modulation and/or demodulation of data, digital-to-analog (DAC) and/or analog-to-digital (ADC) conversion, and/or frequency conversion to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. It should be appreciated that the transceiver 200 can be referred to by another 3GPP protocol in embodiments where the transceiver 200 is configured for such other communications conforming to the 3GPP protocol.

The controller 240 includes suitable logic, circuitry, and/or code that is configured to control the overall operation of the base station 120, including the operation of the transceiver 200. The controller 240 can include one or more processors (CPUs) 250 configured to carry out instructions to perform arithmetical, logical, and/or input/output (I/O) operations of the base station 120 and/or one or more components of the base station 120. The controller 240 can further include a memory 260 that includes suitable logic, circuitry, and/or code that is configured to store data and/or instructions. The memory 260 can be any well-known volatile and/or non-volatile memory, including, for example, read-only memory (ROM), random access memory (RAM), flash memory, a magnetic storage media, an optical disc, erasable programmable read only memory (EPROM), programmable read only memory (PROM) and the like. The memory 260 can be non-removable, removable, or a combination of both.

Figure 3:
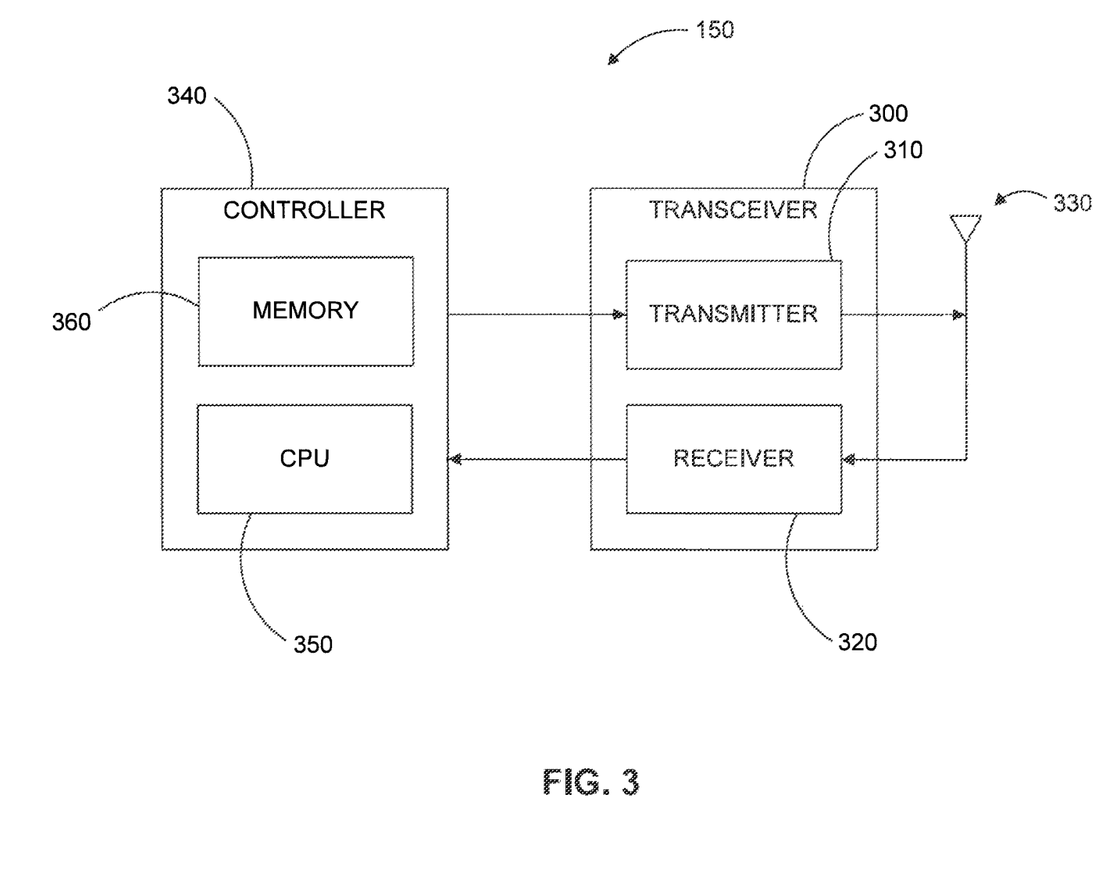
FIG. 3 illustrates an access point according to an exemplary embodiment of the present disclosure.

FIG. 3 illustrates the access point (AP) 150 according to an exemplary embodiment of the present disclosure. For example, the AP 150 can include a transceiver 300 communicatively coupled to a controller 340.

The transceiver 300 is similar to the transceiver 200 and includes suitable logic, circuitry, and/or code that is configured to transmit and/or receive wireless communications via one or more wireless technologies within the communication environment 100. In particular, the transceiver 300 can similarly include a transmitter 310 and a receiver 320 that have suitable logic, circuitry, and/or code configured to transmit and receive wireless communications, respectively, via one or more antennas 330. Those skilled in the relevant art(s) will recognize that the antenna 330 may include an integer array of antennas, and that the antenna 330 may be capable of both transmitting and receiving wireless communication signals. For example, the AP 150 can be configured for wireless communication utilizing a Multiple-input Multiple-output (MIMO) configuration.

In an exemplary embodiment, the transceiver 300 is configured for wireless communications conforming to one or more non-3GPP protocols. For example, the transceiver 300 is configured for wireless communications conforming to IEEE's 802.11 WLAN specification. Here, the transceiver 300 can be referred to as WLAN transceiver 300.

The controller 340 is similar to the controller 240 and includes suitable logic, circuitry, and/or code that is configured to control the overall operation of the AP 150, including the operation of the transceiver 300. The controller 340 can include one or more processors (CPUs) 350 configured to carry out instructions to perform arithmetical, logical, and/or input/output (I/O) operations of the AP 150 and/or one or more components of the AP 150. The controller 340 can further include a memory 360 that includes suitable logic, circuitry, and/or code that is configured to store data and/or instructions. The memory 360 can be any well-known volatile and/or non-volatile memory similar to the memory 260 described above. Similarly, the memory 360 can be non-removable, removable, or a combination of both.

Figure 4:
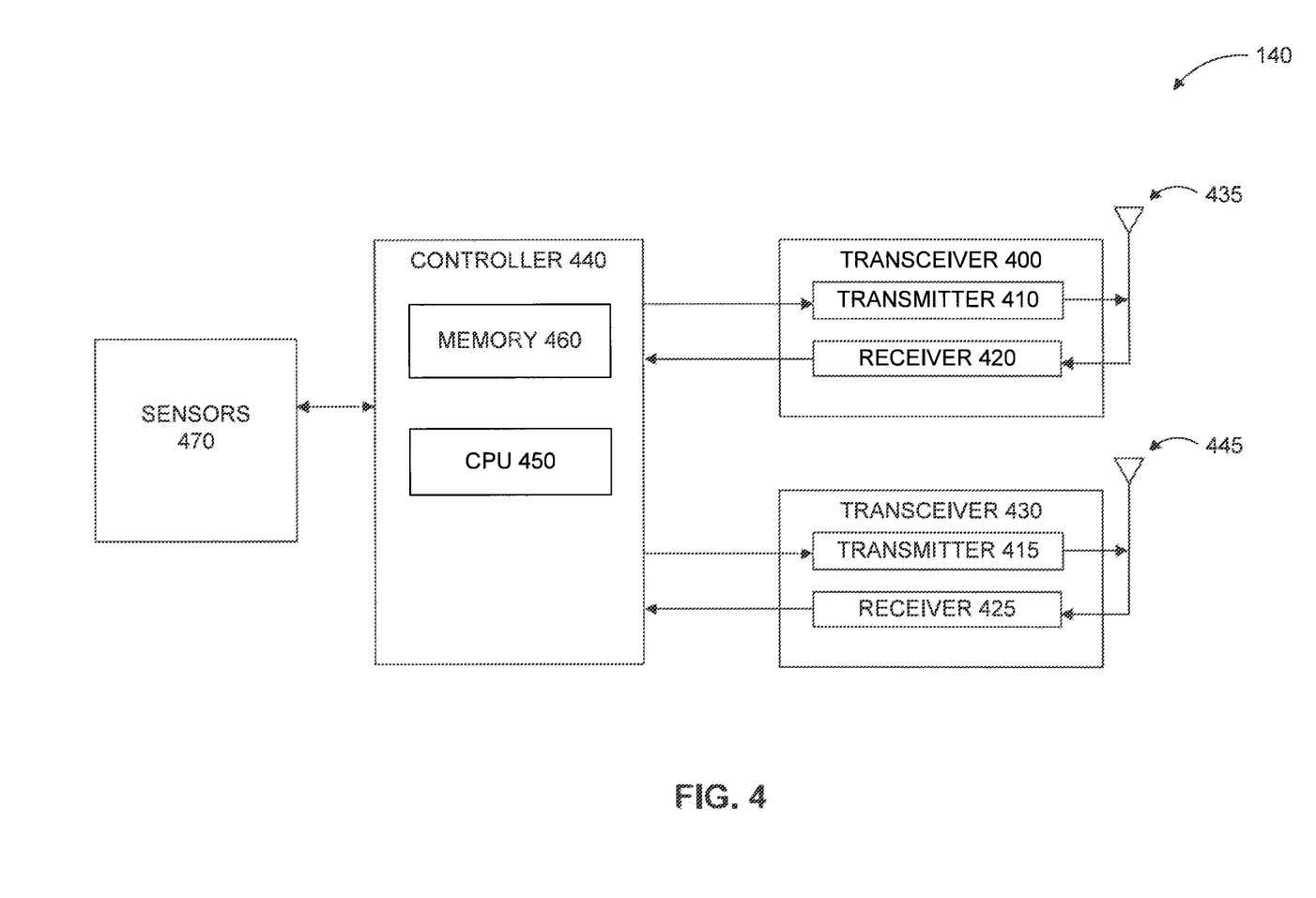
FIG. 4 illustrates a mobile device according to an exemplary embodiment of the present disclosure.

FIG. 4 illustrates the mobile device 140 according to an exemplary embodiment of the present disclosure. The mobile device 140 can include a controller 440 communicatively coupled to an LTE transceiver 400 and a WLAN transceiver 430. The mobile device 140 can be configured for wireless communications conforming to one or more wireless protocols defined by 3GPP and/or one or more non-3GPP wireless protocols. In an exemplary embodiment, the mobile device 140 is configured for wireless communication conforming to 3GPP's LTE specification and for wireless communication conforming to IEEE's 802.11 WLAN specification. Those skilled in the relevant art(s) will understand that the mobile device 140 is not limited to these exemplary 3GPP and non-3GPP wireless protocols, and the mobile device 140 can be configured for wireless communications conforming to one or more other 3GPP and/or non-3GPP wireless protocols in addition to, or in the alternative to, the wireless protocols discussed herein.

The LTE transceiver 400 includes suitable logic, circuitry, and/or code that is configured for transmitting and/or receiving wireless communications conforming to 3GPP's LTE specification. In particular, the LTE transceiver 400 can include an LTE transmitter 410 and an LTE receiver 420 that have suitable logic, circuitry, and/or code configured for transmitting and receiving wireless communications conforming to 3GPP's LTE specification, respectively, via one or more antennas 435. Transceiver 400 need not be limited to LTE, and could operate according to another cellular standard, as will be understood by those skilled in art.

The WLAN transceiver 430 includes suitable logic, circuitry, and/or code that is configured for transmitting and/or receiving wireless communications conforming to IEEE's 802.11 WLAN specification. In particular, the WLAN transceiver 430 can include a WLAN transmitter 415 and a WLAN receiver 425 that have suitable logic, circuitry, and/or code configured for transmitting and receiving wireless communications conforming to IEEE's 802.11 WLAN specification, respectively, via one or more antennas 445.

Regarding the LTE transceiver 400 and the WLAN transceiver 430, the processes for transmitting and/or receiving wireless communications can include (but are not limited to) digital signal processing, modulation and/or demodulation of data, DAC and/or ADC conversion, and/or frequency conversion to provide some examples. Further, those skilled in the relevant art(s) will recognize that antennas 435 and/or 445 may include an integer array of antennas, and that the antennas may be capable of both transmitting and receiving wireless communication signals.

The controller 440 includes suitable logic, circuitry, and/or code that is configured to control the overall operation of the mobile device 140, including the operation of the LTE transceiver 400 and WLAN transceiver 430. The controller 440 can include one or more processors (CPUs) 450 configured to carry out instructions to perform arithmetical, logical, and/or input/output (I/O) operations of the mobile device 140 and/or one or more components of the mobile device 140. The controller 440 can further include a memory 460 that is similar to memories 260 and 360, and includes suitable logic, circuitry, and/or code that is configured to store data and/or instructions. Similarly, the memory 460 can be any well-known volatile and/or non-volatile memory, and can be non-removable, removable, or a combination of both.

In exemplary embodiments of the present disclosure, and as discussed in more detail below, the mobile device 140 can be configured to gather network information of one or more available communication networks within the communication environment 100 and/or contextual information (e.g., time, location, movement, etc.) associated with the mobile device 140.

The gathering of network information can include (but is not limited to), for example, measuring and/or analyzing network conditions, and/or identifying one or more base stations and/or access points that are visible to the mobile device. The network conditions can, for example, include signal strength (e.g., received signal strength indication (RSSI)) of signals associated with the network(s)), one or more noise and/or interference measurements indicative of the noise and/or interference associated with the network(s) (e.g., signal-to-interference-plus-noise ratio (SINK)), network visibility information, supported and/or current data rates of the network(s), quality of service (QoS) information of the network(s), network type and/or venue information of the network(s), and/or one or more other network parameters that are indicative of the condition (e.g., health) of the available communication network(s).

The gathering of contextual information can include (but is not limited to), for example, determining the time as reported by the operating system of the mobile device 140, the location of the mobile device 140, the movement of the mobile device 140, model and/or type of the mobile device 140, information regarding the capabilities of the mobile device 140, information regarding one or more components implemented in the mobile device 140, power management information (e.g., remaining battery power, charging status, etc.) of the mobile device 140, and/or any other environmental information associated with the mobile device 140 as will be apparent to those of ordinary skill in the relevant art(s) without departing from the spirit and scope of the present disclosure. The location and/or movement of the mobile device 140 can be determined using one or more positional and/or movement sensors 470 (e.g., GPS, accelerometer, gyroscope sensor, etc.) implemented in (and/or in communication with) the mobile device 140, and/or using one or more positional determinations using signal characteristics relative to one or more base stations and/or access points.

Here, the available communication networks refer to communication networks within the communication environment 100 that are currently visible to the mobile device 140. Further, the mobile device 140 can be configured to provide the gathered information to one or more service providers via one or more of the 3GPP and/or non-3GPP communication networks. For the purposes of this disclosure, the gathering and providing of information to the service provider(s) can be referred to as a "crowdsourcing" process.

In an exemplary embodiment, the gathering and providing (e.g., crowdsourcing) of information is performed automatically in the background of the operating system of the mobile device 140 and does not require interaction from a user of the mobile device 140. Further, the mobile device 140 can be configured to performing one or more crowdsourcing processes in response to instructions and/or requests received by the mobile device 140 from one or more service providers and/or from the user of the mobile device 140. That is, the one or more service providers can instruction the mobile device 140 to gather information and then provide the gathered information to the service provider via one or more 3GPP and/or non-3GPP communication networks. Further, the gathered information can be stored and/or maintained in a policy server that is communicatively coupled to the mobile device 140 via one or more of the communication networks.

In an exemplary embodiment, the controller 440 can be configured to gather the network information of the one or more available communication networks within the communication environment 100 and/or the contextual information (e.g., time, location, movement, etc.) associated with the mobile device 140, as well as to provide the gathered information to the service provider(s). The gathered information can also be stored in the memory 460, and accessed and processed by the CPU 450.

In an exemplary embodiment, the mobile device 140 includes one or more other transceivers configured to communicate via one or more well-known communication technologies (e.g., CDMA, GSM, or the like). The one or more other transceivers can also be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples.

In an exemplary embodiment, one or more service providers are configured to provide the mobile device 140 with one or more operational parameters, policies, and/or conditions that are utilized by the mobile device 140 in configuring the operation of the mobile device 140. The operational parameters, policies, and/or conditions can be collectively referred to as an operational framework. Here, the operational framework is used by the service provider(s) to control the operation of the mobile device 140. The operational framework can define, for example, one or more communication networks that can be used by the mobile device 140, one or more policies for inter-system offloading between one or more 3GPP and/or non-3GPP communication networks, and/or the network, contextual, and/or environmental information that is to be determined (e.g., gathered) and/or reported to the service provider by the mobile device 140. Further, the inter-system offloading policies can be used to control the offloading of communications by the mobile device 140, including, for example, the offloading of communications from the base station 120 to the AP 150, from the AP 150 to the base station 120, or a combination of both. For example, the mobile device 140 can be configured to offload communications with the base station 120 to the AP 150 based on one or more inter-system offloading policies defined in the operational framework that is provided to the mobile device 140 by the one or more service providers.

In an exemplary embodiment, the operational framework can be maintained in a server that is communicatively coupled to the mobile device 140 via one or more communication networks associated with the one or more service providers.

In an exemplary embodiment, the operational framework conforms to, or is associated with, the Access Network Discovery and Selection Function (ANDSF) framework as defined in the 3GPP TS 24.312 specification, which is incorporated herein by reference in its entirety. The ANDSF framework is an entity introduced by 3GPP as part of the Release 8 set of specifications, within an Evolved Packet Core (EPC) of the System Architecture Evolution (SAE) for 3GPP compliant communication networks. The ANDSF framework assists the mobile device 140 to discover one or more non-3GPP communication networks (e.g., WLAN, WIMAX, etc.) that can be used for data communications in addition to one or more 3GPP communication networks (e.g., LTE, HSPA, etc.) and to provide the mobile device 140 with rules (e.g., policy conditions) that control the connection to the 3GPP and/or non-3GPP communication networks.

The ANDSF framework is defined by one or more ANDSF Management Objects (MO) that are generated by the service providers of the one or more 3GPP communication networks and provided to the mobile device 140. The ANDSF MOs of the framework can provide the mobile device 140 with the following information, based on the service provider's configuration:

1. Inter-System Mobility Policy (ISMP)—network selections rules for a mobile device with no more than one active communication network connection (e.g., either LTE or WLAN).
2. Inter-System Routing Policy (ISRP)—network selection rules for the mobile device with potentially more than one active communication network connection (e.g., both LTE and WLAN). Here, the mobile device may employ IP Flow Mobility (IFOM), Multiple Access Packet Data Networks (PDN) Connectivity (MAPCON) or non-seamless WLAN offloading according to operator policy and user preferences.
3. Discovery Information—a list of networks that may be available in the vicinity of the mobile device and information assisting the mobile device to expedite the connection to these networks.
4. Crowdsourcing Information—the network, contextual, environmental information, and/or other types of information that is to be crowdsourced by the mobile device.

Here, the ANDSF framework assists the mobile device 140 to discover communication networks in the vicinity of the mobile device 140 and prioritize/manage connections to the communication networks, as well as provide crowdsourcing parameters. The policies set forth in the ANDSF framework can be statically pre-configured on the mobile device or dynamically updated by the service provider and provided to the mobile device 140 via the Open Mobile Alliance (OMA) Device Management (DM) protocol specified by the OMA DM Working Group and the Data Synchronization (DS) Working Group. The OMA DM protocol is incorporated herein by reference in its entirety.

The ANDSF framework can be referred to as an ANDSF Management Object (MO) that include various rules, conditions, parameters, and other information organized into one or more "nodes" that may have one or more "leaf objects" descending therefrom. The nodes and leaf objects define the various rules, condition, parameters, etc. that are used by the mobile device 140 in governing the ISMP, ISRP, Discovery, and crowdsourcing processing by the mobile device 140. For example, the ANDSF MO is used by the mobile device 140 to establish communications via one or more non-3GPP communication networks (e.g., WLAN communication network on AP 150) and effectuate offloading of the mobile device's 140 communications via the base station 120 to, for example, the AP 150. Similarly, the ANDSF MO is used by the service provider to instruct the mobile device 140 what information of the communication networks to crowdsource and provide to the service provider.

The ANDSF MOs can be maintained by an ANDSF server that is communicatively coupled to the mobile device 140 via one or more communication networks associated with the one or more service providers (e.g., via the base station 120). The various rules and information within the ANDSF MO can be either statically pre-configured on the mobile device 140 or dynamically updated by the service provider and provided to the mobile device 140. The ANDSF MO can be stored in the memory 460 of the mobile device 140, and accessed and executed by the CPU 450 to effectuate the ISMP, ISRP, Discovery, crowdsourcing, and/or offloading processing.

Figure 5:
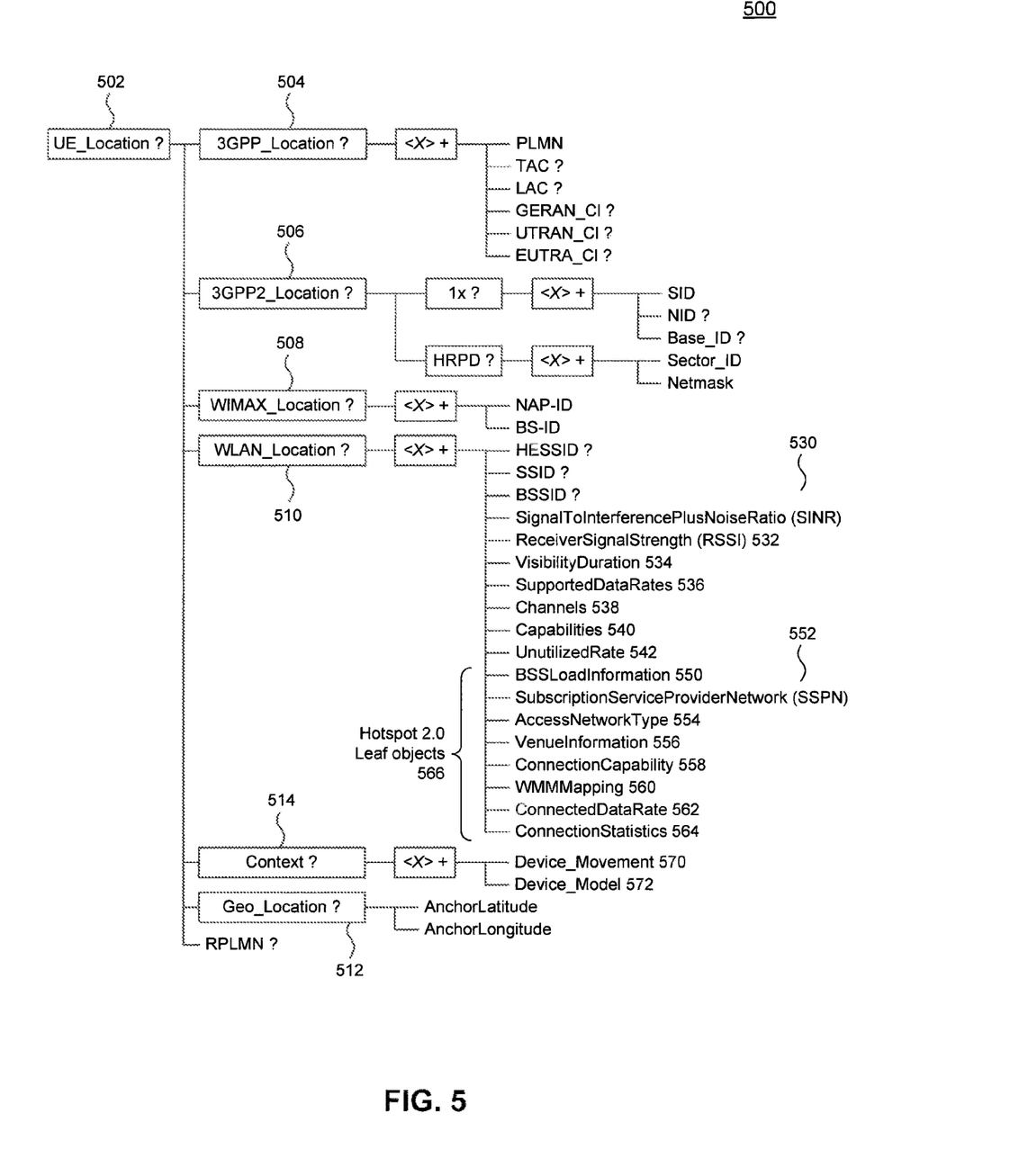
FIG. 5 illustrates an operational framework according to an exemplary embodiment of the present disclosure.

In operation, with reference to FIG. 5, when a condition within the ANDSF MO becomes "active" (e.g., the mobile device 140 moves within range of a communication network serving cell (e.g., geographic area) that is specified in a node/leaf of the of the ANDSF MO), the mobile device 140 notifies the event to the ANDSF server and requests the Inter-system Discovery Information based on the preferred access technology recommended in the MO. The ANDSF server will provide the mobile device 140 with the communication network's identification information (e.g., WLAN Hotspot SSIDs) in the vicinity and related access information (e.g., WLAN security keys). The mobile device 140 uses this information to connect to the other communication network. Further, the mobile device 140 can offload communications originally destined for the original serving communication network (e.g., LTE) to the other communication network (e.g., WLAN) based on rules set forth in the ANDSF MO. The mobile device 140 can also be configured to gather information associated with the other communication network as defined in the ANDSF MO, as well as determine contextual information of the mobile device 140 as defined in the ANDSF MO. The gathered network information and/or the contextual information can be provided to the service provider associated with the ANDSF MO (e.g., the LTE service provider), which can then be used by the service provider to determine the quality and/or coverage of the communication network so as to generate network coverage maps.

FIG. 5 illustrates an example ANDSF Management Object (MO) 500 according to exemplary embodiments of the present disclosure. The ANDSF MO 500 can be implemented by the mobile device 140, base station 120 and/or AP 150 as described herein. The ANDSF MO can be stored in the memory 460 of the mobile device 140, and accessed and executed by the CPU 450 to effectuate the ISMP, ISRP, Discovery, crowdsourcing, and/or offloading processing.

The ANDSF MO 500 provides an operational framework that includes various rules/conditions and information organized into one or more "nodes," where each node may have one or more "leaf objects." The nodes are organized into a hierarchy with one or more nodes having one or more decedent nodes. It should also be appreciated that the one or more nodes may not have any descendent nodes. The last node in a hierarchal branch can include one or more leaf objects that define a rule and/or contain information associated with a corresponding communication network. For example, the nodes and leaf objects define the various rules, discovery information, and crowdsourcing information that are used by the mobile device 140 in governing the ISMP, ISRP, Discovery, and crowdsourcing processing by the mobile device 140.

In an exemplary embodiment, the ANDSF MO 500 includes one or more nodes and/or leaf objects having portions of which that are defined in the 3GPP TS 24.312 specification. For example, the ANDSF MO 500 includes UE_Location 502, which includes the following decedent nodes: 3GPP_Location 504, 3GPP2_Location 506, WiMAX_Location 508, WLAN_Location 510, and Geo_Location 512 that are previously defined in the 3GPP TS 24.312 specification. Other nodes and leaf object, including the context node 514 and leaf objects 530 to 572, are not currently defined in the 3GPP specification and are added herein according to exemplary embodiments of the disclosure. Accordingly, ANDSF MO 500 described herein can be considered an extension of ANDSF MO that currently provided by the 3GPP TS 24.312 specification. The context node 514 and the leaf objects descending therefrom define per-device crowdsourcing and/or inter-system offloading parameters. That is, the context node 514 and the leaf objects descending therefrom define device specific parameters that can be used for crowdsourcing and/or offloading purposes. The leaf objects 530 to 572 define per-network crowdsourcing and/or inter-system offloading parameters. That is, the leaf objects 530 to 572 define network specific parameters that can be used for crowdsourcing and/or offloading purposes.

The UE_Location 502 is a placeholder for describing the current location of the mobile device 140. The UE_Location 502 can include one or more decedent nodes, including (but not limited to): 3GPP_Location 504, 3GPP2_Location 506, WiMAX_Location 508, WLAN_Location 510, and Geo_Location 512.

The 3GPP_Location 504 is a placeholder for 3GPP location descriptions, and can include one or more leaf objects that indicate 3GPP network location information for the mobile device 140. The 3GPP network location information can include, for example, a public land mobile network (PLMN) code, a Tracking Area Code (TAC), a Location Area Code (LAC), a GSM EDGE Radio Access Network (GERAM) Cell Identity (GERAM_CI), a Universal Terrestrial Radio Access Network (UTRAN) Cell Identity (UTRAN_CI), a Evolved Universal Terrestrial Radio Access (E-UTRA) Cell Identity (EUTRA_CI), and any other well-known 3GPP network location information as would be understood by those skilled in the relevant arts.

The 3GPP2_Location 506 is a placeholder for 3GPP2 location descriptions, and can include one or more decedent nodes, including, for example, a 1× node that is a placeholder for 3GPP2 1× Radio Access Technologies (RAT) location information and a High Rate Packet Data (HRPD) node that is a placeholder for 3GPP2 HRPD RAT location information. The 1× node and HRPD node can each have one or more leaf objects that indicate 3GPP2 network location information to the mobile device 140. The 3GPP2 network location information can include, for example, a System Identification code (SID), a Network Identification code (NID), a Base Station Identification code (Base_ID), a Sector Identification code (Sector_ID), a Netmask code (Netmask), and any other well-known 3GPP2 network location information as would be understood by those skilled in the relevant arts.

The WiMAX_Location 508 is a placeholder for WiMAX (Worldwide Interoperability for Microwave Access) location descriptions, and can include one or more leaf objects that indicate WiMAX network location information to the mobile device 140. The WiMAX network location information can include, for example, a Network Access Provider identification (NAP-ID), a BS Identifier (BS-ID), and any other well-known WiMAX network location information as would be understood by those skilled in the relevant arts.

The Geo_Location 512 is a placeholder for geographical location descriptions for locations of one or more access networks, and can include one or more leaf objects that indicate geographical location information. The geographical location information can include, for example, AnchorLongitude, AnchorLatitude, and/or any other well-known geographical location information as would be understood by those skilled in the relevant arts.

The WLAN_Location 510 is a placeholder for WLAN location descriptions, and can include one or more leaf objects that indicate WLAN location information. The WLAN location information can include (but is not limited to) a HESSID (homogenous extended service set identifier), a BSSID (basic service set identifier), and a SSID (service set identifier), to provide some examples. The HESSID is a media access control (MAC) address that is the same on all access points belonging to a particular network. Similarly, the BSSID and SSID are identifiers used to identify the basic service set (e.g., an access point and one or more stations). For example, BSSID uniquely identifies the basic service set (BSS) and is a MAC address of the wireless access point generated by combining the 24 bit Organization Unique Identifier (e.g., the manufacturer's identity) and the manufacturer's assigned 24-bit identifier for the radio chipset in the access point. The SSID is 1 to 32 byte string and is typically a human-readable string commonly called the "network name." The HESSID, BSSID and SSID are further defined in the IEEE 802.11 standard, which is incorporated herein by reference in its entirety.

In operation, the mobile device 140 is configured to gather network information of the one or more available communication networks within the communication environment 100 and/or to determine contextual information (e.g., time, location, movement, etc.) associated with the mobile device 140, as well as to provide the information to the service provider(s). The provided information can be utilized by the service providers to determine the location of the mobile device 140 and provide the mobile device 140 with one or more relevant operational frameworks (e.g., ANDSF framework) for the determined location. The provided information may also be used by the service providers to generate network coverage maps for one or more communication networks within the communication environment 100 and/or increase the accuracy of one or more previously generated network coverage maps. Further, the provided information can be used to generate one or more inter-system offloading policies defined in the operational framework and/or improve the quality of one or more previously generated inter-system offloading policies.

In an exemplary embodiment, in addition to 3GPP_Location 504, 3GPP2_Location 506, WiMAX_Location 508, WLAN_Location 510, and Geo_Location 512, the ANDSF MO 500 also includes a context node 514 including contextual information for movement and device identification that is not currently defined in 3GPP TS specification. The context node 514 can include one or more leaf objects defining information and/or validity conditions associated with, for example, the movement of the mobile device 140, and model and/or type identification of the mobile device 140. Accordingly, the context node 514 can include (but is not limited to) one or more of the following leaf objects: Device_Movement 570 and/or Device_Model 572.

The Device_Movement leaf 570 defines information and/or validity conditions associated with the movement of the mobile device 140, including for example, velocity and/or acceleration of the mobile device 140. The mobile device 140 can be configured to estimate its movement using: one or more sensors 470 implemented in (and/or in communication with) the mobile device 140, one or more positional determinations using signal characteristics relative to one or more base stations and/or access points, and/or any other well-known geo-location techniques as would be understood by the those skilled in the relevant art(s). The one or more sensors 470 can include (but is not limited to) GPS sensors, accelerometers, gyroscopes, and/or any other well-known positional and/or movement sensor as would be understood by those skilled in the relevant art(s).

The Device_Movement leaf 570 can also define one or more movement states of the mobile device 140. For example, the movement states can include: stationary, pedestrian (e.g., PA3 or PB3), vehicular (e.g., VA30), high-speed rail, aviation, or any other movement states defined by 3GPP, or as would understood by those skilled in the relevant art(s). The pedestrian states PA3 and PB3 refer to the Pedestrian-A (3 km/h) and Pedestrian-B (3 km/h) movement states, respectively, as defined by 3GPP. Similarly, the vehicular state VA30 refers to the Vehicular-A (30 km/h) movement state as defined by 3GPP. Although defined by 3GPP, theses movement states have not previously been implemented in the ANDSF MO currently provided by the 3GPP TS 24.312 specification. Based on the estimated velocity of the mobile device 140, the mobile device 140 can be categorized into one or more of the movement states discussed herein.

The Device_Model leaf 572 defines information and/or validity conditions associated with the model, type and/or manufacturer of the mobile device 140. In operation, the various mobile devices within the communication environment 100 can, for example, have different manufactures and/or be different mobile device models. The differing models may include varying types of radio transceivers and/or radio transceivers having varying operating characteristics. For example, a first model may have higher gain WLAN and LTE antennas when compared to a second model. Here, the varying gain values of the antennas can be accounted for by the service provider in determining, for example, the appropriate operational framework and/or in generating one or more network coverage maps of the communication environment 100. Further, antenna gain can affect the handover decision because higher antenna gain (or more generally, receiver gain) can compensate for lower signal strength.

In an exemplary embodiment, in addition to 3GPP_Location 504, 3GPP2_Location 506, WiMAX_Location 508, WLAN_Location 510, and Geo_Location 512, the ANDSF MO 500 also includes one or more leaf objects 530 to 572 that are not currently defined in 3GPP TS specification. The one or more leaf objects 530 to 572 can be referred herein as crowdsourcing leaf objects. Further, the crowdsourcing leaf objects are not limited to the leaf objects 530 to 572 and can include one or more leaf objects as would be understood by those skilled in the relevant art(s) without departing from the spirit and scope of the present disclosure.

The leaf objects 530 to 572 can be defined in the ANDSF MO 500 as descendants of one or more of the included nodes (e.g., 3GPP_Location 504, 3GPP2_Location 506, WiMAX_Location 508, WLAN_Location 510, and Geo_Location 512), as descendants of the contextual node 514, as descendants of one or more other nodes defined by 3GPP, and/or as descendants of one or more other nodes as would be understood by those skilled in the relevant art(s) without departing from the spirit and scope of the present disclosure. In the exemplary embodiments described herein, the crowdsourcing leaf objects (e.g., leaf objects 530 to 572) are descendent leaf objects of the WLAN_Location node 510. However, the crowdsourcing leaf objects can be descendent leaf objects of one or more of the other nodes described herein and/or one or more other nodes as would be understood by one of ordinary skill in the relevant art(s). For example, the crowdsourcing leaf objects can be descendent leaf objects of the WiMAX_Location node 508 in addition to, or in the alternative, to the WLAN_Location node 510.

The crowdsourcing leaf objects can include (but are not limited to) one or more of the following leaf objects:
    SignalToInterferencePlusNoiseRatio (SINR) leaf 530,
    ReceiverSignalStrength (RSSI) leaf 532,
    VisibilityDuration leaf 534,
    SupportedDataRates leaf 536,
    Channels leaf 538,
    Capabilities leaf 540,
    UnutilizedRate leaf 542
    BSSLoadInformation leaf 550,
    SubsciptionServiceProviderNetwork (SSPN) leaf 552.
    AccessNetworkType leaf 554,
    VenueInformation leaf 556,
    ConnectionCapability leaf 558,
    WMMMapping leaf 560,
    ConnectedDataRate leaf 562, and/or
    ConnectionStatistics leaf 564

The SINR leaf 530 and RSSI leaf 532 define signal strength and quality information of one or more other prospective communication networks (e.g., WLAN network of the AP 150). The SINR leaf 530 and the RSSI leaf 532 define signal-to-interference-plus-noise ratio (SINR) and received signal strength indication (RSSI) thresholds (dB), respectively, for a wireless connection between the mobile device 140 and the other (prospective) communication network(s).

The SINR leaf 530 and RSSI leaf 532 can also define validity conditions associated with the signal strength and quality information of the other communication network(s). The SINR leaf 530 and RSSI leaf 532 can also define threshold levels determined by the service provider and can be considered active if the SINR and/or the RSSI of the connection are above the threshold levels. Here, the SINR leaf 530 and RSSI leaf 532 collectively serve as a secondary threshold for the wireless connection. That is, the mobile device 140 may have a minimum RSSI and/or SINR threshold value (i.e., a "connection threshold") used for determining if a wireless connection can be established, according to the device hardware specifications. The thresholds defined in the SINR leaf 530 and RSSI leaf 532 can then serve as threshold values that exceed the minimum (device) threshold and thereby ensure a higher quality connection than one that may be formed if only the connection threshold is satisfied. By using the SINR leaf 530 and RSSI leaf 532 as validity conditions, the SINR leaf 530 and RSSI leaf 532 can be utilized in one or more inter-system offloading policies.

The VisibilityDuration leaf 534 defines visibility information for one or more other communication networks (e.g., WLAN network of the AP 150). In particular, the VisibilityDuration leaf 534 defines one or more respective time durations in which the one or more other communication networks have been visible to the mobile device 140 and/or one or more other mobile devices. The visibility duration can include the current duration in which one or more other communication networks has been visible to the mobile device 140, one or more previous durations in which the one or more other communication networks has been visible to the mobile device 140, or a combination of both. Herein, "visibility" refers to observing or receiving signal strengths that are above a pre-determined threshold (e.g., received signal strength indication (RSSI) threshold), so a connection could be made if desired. The VisibilityDuration leaf 534 can also define one or more time durations in which the mobile device 140 and/or one or more other mobile devices have previously remained connected to the one or more other communication networks.

The service provider and/or the mobile device 140 can be configured to estimate the stability of the connection using the visibility durations and/or the durations of one or more previously established connections to the other communication network. For example, multiple, short visibility and/or connection durations of the one or more communication networks by the mobile device 140 (or other mobile devices) may evidence a wireless connection that repeatedly becomes available and unavailable due to an access point that is subject to, for example, shadowing, slow fading, or any other condition resulting in instability in the connection. Alternatively, short visibility or connection durations may be evidence that the mobile device 140 previously encountered the other communication networks while the mobile device 140 is moving through the communication network at such a speed that communication network remains visible for only short durations.

In an exemplary embodiment, the mobile device 140 can be configured to estimate the stability of the connection utilizing a Poisson probability distribution with a fixed but unknown lambda. Here, the longer visibility and/or connection durations result in a lower estimated lambda, which results in a longer expected duration until the next disconnection. A longer expected duration may evidence a more stable connection.

The SupportedDataRates leaf 536 defines data rate and/or technology information for one or more other prospective communication networks (e.g., WLAN network of the AP 150). In particular, the SupportedDataRates leaf 536 defines data rates and/or technologies (e.g., IEEE 802.11n, 802.11g, or the like) supported by the communication network(s). For example, the supported data rates can include, for example, a maximum data rate as defined by the service provider, a maximum or expected data rate as defined by a supported technology, maximum or expected data rates as defined by the access point, or any other data rate as would be understood by one of ordinary skill in the relevant art(s) without departing from the spirit and scope of the present disclosure.

The SupportedDataRates leaf 536 can also define validity conditions associated with the data rates and/or technologies supported by the one or more other prospective communication network(s). For example, the SupportedDataRates leaf 536 can also define data rate threshold levels determined by the service provider and/or the access point and can be considered active if the data rate of the connection with access point is above the data rate threshold levels. By using the SupportedDataRates leaf 536 as validity conditions, the SupportedDataRates leaf 536 can be utilized in one or more inter-system offloading policies.

The Channels leaf 538 defines one or more operating channels for one or more other prospective communication networks (e.g., WLAN network of the AP 150). The operating channels can include the current operating channels utilized by one or more active connections to the communication network and/or the channels supported by the communication network.

The Capabilities leaf 540 defines one or more capabilities supported by one or more other prospective communication networks (e.g., WLAN network of the AP 150). The capabilities can include, for example, encryption protocols, power saving mode(s), extended service set (ESS) support, managed (infrastructure)/ad hoc support, or any other capability as would be understood by one of ordinary skill in the relevant art(s) without departing from the spirit and scope of the present disclosure.

The UnutilizedRate leaf 542 defines information and/or validity conditions associated with data rate information and/or channel utilization information of the other prospective communication network (e.g., WLAN network of the AP 150). Here, a "data rate validity condition" can be used to refer to the data rate information, the channel utilization information, or a combination of both. In particular, the UnutilizedRate leaf 542 defines an estimated data rate available to the mobile device 140 on, for example, the WLAN network of the AP 150, and an estimated WLAN channel utilization on the network. The data rate can include the estimated maximum bit rate (MBR) and/or guaranteed bit rate (GBR).

The AP 150 can be configured to estimate the data rate on the WLAN network (i.e., via the wireless medium) and the channel utilization using any well-known date rate and/or channel utilization estimation processes that would be understood by those skilled in the relevant art(s), including, for example, estimations based on the "average cycle time" approach discussed in "Throughput Analysis of IEEE 802.11 Wireless LANs using Average Cycle Time Approach," K. Medepalli and F. A. Tobagi, Proceedings of IEEE Globecom 2005, and discussed in U.S. patent application Ser. No. 14/149,390, filed Jan. 7, 2014, entitled "Mobile Device With Cellular-WLAN Offload Using Passive Load Sensing Of WLAN," each of which is incorporated herein by reference in its entirety.

In operation, the AP 150 can, for example, analyze the current GBR and/or MBR for ongoing services of the AP 150. Here, the ongoing services of the AP 150 refer to one or more active connections of other mobile devices to the AP 150 and the respective data rates of these connections. The AP 150 can then compare the value(s) for ongoing services with an estimation of GBR and/or MBR of the AP 150 that includes a prospective connection of the mobile device 140 to determine if the AP 150 can provide reliable offloading to the mobile device 140. For example, the AP 150 can determine that the AP 150 can provide reliable offloading when the estimated GBR is equal to or greater than the total GBR for ongoing services (e.g., ongoing GBR bearers), and the estimated MBR is equal to or greater than a predetermined percentage of the total MBR for ongoing services (e.g., ongoing MBR bearers).

That is, in an exemplary embodiment, the AP 150 can determine that the AP 150 can provide reliable offloading if, for example, the following equations are satisfied:

$$GBR_{estimate} \geq GBR_{ongoing}$$

$$MBR_{estimate} \geq MBR_{ongoing} \times \beta$$

Where $GBR_{estimate}$ is the estimated GBR, $GBR_{ongoing}$ is the total GBR for ongoing services, $MBR_{estimate}$ is the estimated MBR, $MBR_{ongoing}$ is the total MBR for ongoing services, and $\beta$ is a predetermine value such that $0 < \beta \leq 1$.

In an exemplary embodiment, the AP 150 can be provided with bandwidth information for the backhaul connection supporting the AP 150. The backhaul bandwidth information can be provided from, for example, the service provider supporting the AP 150. Here, the UnutilizedRate leaf 542 can then include the backhaul bandwidth information so that an overall bandwidth estimation can be calculated using the backhaul and wireless medium estimations.

In exemplary embodiments, the AP 150 is configured to be Hotspot 2.0 compliant, as defined in the IEEE 802.11u standard. In these embodiments, the ANDSF MO 500 can include the following leaf objects: BSSLoadInformation leaf 550, SubscriptionServiceProviderNetwork (SSPN) leaf 552, AccessNetworkType leaf 554, VenueInformation leaf 556. ConnectionCapability leaf 558, WMMMapping leaf 560, ConnectedDataRate leaf 562, and/or ConnectionStatistics leaf 564. Leaf objects 550 to 564 can collectively be referred to as Hotspot 2.0 leaf objects 566. It will be appreciated and understood by those skilled in the relevant arts that the Hotspot 2.0 leaf objects 566 are not limited to embodiments utilizing a Hotspot 2.0 compliant access point, and that the Hotspot 2.0 leaf objects 566 can be implemented in non-Hotspot 2.0 compliant access points without departing from the spirit and scope of the present disclosure.

The BSSLoadInformation leaf 550 defines basic service set (BSS) load information and/or WLAN Metrics Access Network Query Protocol (ANQP) information for one or more other communication networks (e.g., WLAN network of the AP 150). The BSS load information can include current mobile device population utilizing the communication network and the channel utilization of the prospective communication network. The WLAN Metrics ANQP information can include information regarding the wide area network (WAN) link of the WLAN access network. That is, the WLAN Metrics ANQP information includes information regarding the backbone network supporting the wireless access point.

The SubscriptionServiceProviderNetwork (SSPN) leaf 552 defines identification information for one or more other prospective communication networks (e.g., WLAN network of the AP 150). That is, the SSPN leaf 552 indicates the service provider in which the access point is associated with.

The AccessNetworkType leaf 554 defines the WLAN network type for one or more other prospective communication networks (e.g., WLAN network of the AP 150). The WLAN network type can include, for example, a public network, a free network, a personal network, an emergency network, a government network, or the like. That is, the AccessNetworkType leaf 554 indicates which type of network is provided by the access point.

The VenueInformation leaf 556 defines venue information for one or more other prospective communication networks (e.g., WLAN network of the AP 150). The venue information can include, for example, a residence, a commercial space (e.g., business), a hospital, a hotel, a school, a municipal space, or the like. That is, the VenueInformation leaf 556 indicates the venue in which the network is deployed. For example, for venue information indicating that the network is deployed in a municipal space or school, the venue information may indicate that the communication network may possibly be an extended communication network (e.g., Municipal wireless networks, campus-wide networks, or the like) that offers continuous coverage over multiple access points.

The ConnectionCapability leaf 558 defines connection information for one or more other prospective communication networks (e.g., WLAN network of the AP 150). The connection information can define, for example, one or more IP protocols and/or ports that are used by the communication networks. That is, the ConnectionCapability leaf 558 can indicate the IP protocols and/or ports that are allowed on the communication network.

The WMMMapping leaf 560 defines information and/or validity conditions associated with quality of service (QoS) information of the other communication network (e.g., WLAN network of the AP 150). In particular, the WMMMapping leaf 560 defines WLAN multimedia (WMM) mapping to provide, for example, packet priority information, packet error loss rate information and/or packet delay budget information. In an exemplary embodiment, the WMM mapping (and the various provided information) is similar to the QoS Class Identifier (QCI) mapping defined in the 3GPP specification. Using the information defined in the WMMMapping leaf 560, the mobile device 140 can determine whether the WLAN network will provide the same or better QoS as the LTE network, which typically provides low latency for Real-time Transport Protocol (RTP) traffic (e.g., voice and/or video traffic).

The ConnectedDataRate leaf 562 defines data rate information for one or more communication networks. The data rate information can include, for example, the data rate for one or more wireless networks that the mobile device 140 is currently connected to. The date rate information can be used by the service provider in determining the quality of the connected communication networks, which can be used in, for example, generating coverage maps at the location of the mobile device 140.

The ConnectionStatistics leaf 564 defines statistical information for one or more communication networks. The statistics can include, for example, a transmit loss (e.g., retry) rate, a receive loss (e.g., loss) rate, a beacon miss rate, and/or any other connection statistic as would be understood by those skilled in the relevant art(s) for one or more communication networks the mobile device 140 is connected to. Similar to the data rate information defined in the ConnectedDataRate leaf 562, the statistics can be used by the service provider in determining the quality of the connected communication networks, which can be used in, for example, generating coverage maps at the location of the mobile device 140.

In an exemplary embodiment, the mobile device 140 is configured to gather the network information of the one or more available communication networks within the communication environment 100 and/or the contextual information (e.g., time, location, movement, etc.) associated with the mobile device 140. That is, the mobile device 140 can be configured to crowdsource information from one or more communication networks and/or gather contextual information of the mobile device 140. The crowdsourced and/or gathered information can be provided to the service provided via one or more 3GPP and/or non-3GPP access networks.

In operation, the mobile device 140 can be configured to gather (e.g., crowdsource) network information of one or more available communication networks within the communication environment 100 and/or to determine contextual information associated with the mobile device 140 based on one or more parameters and/or validity conditions defined in an operational framework. In an exemplary embodiment, the operational framework conforms to the Access Network Discovery and Selection Function (ANDSF) framework.

For example, the mobile device 140 can be configured to gather and provide (e.g., crowdsource) network information, including, for example, signal strength and/or interference measurements (e.g., SINR leaf 530, RSSI leaf 532), network visibility information (e.g., VisibilityDuration leaf 534), supported and/or current data rates of the network(s) (e.g., SupportedDataRates leaf 536, UnutilizedRate leaf 542, ConnectedDataRate leaf 562), quality of service (QoS) information of the network(s) (e.g., WMMMapping leaf 560), network identification information and/or network type (e.g., SSPN leaf 552, AccessNetworkType leaf 554, VenueInformation leaf 556), and/or any other network parameter and/or validity condition as would be understood by those skilled in the relevant art(s). Further, the mobile device 140 can be configured to determine contextual information associated with the mobile device 140, including, for example, the time as reported by the operating system of the mobile device 140, the location of the mobile device 140, the movement of the mobile device 140, the model and/or type of the mobile device 140, information regarding the capabilities of the mobile device 140, information regarding one or more components implemented in the mobile device 140, power management information (e.g., remaining battery power, charging status, etc.) of the mobile device 140, and/or any other environmental information associated with the mobile device 140 as will be apparent to those of ordinary skill in the relevant art(s) without departing from the spirit and scope of the present disclosure.

The mobile device 140 can also be configured to provide the network information and/or the contextual information to the service provider via one or more 3GPP and/or non-3GPP access networks. The service provider can be configured to determine and/or analyze the quality and/or availability/coverage of the communications networks based on the provided network and/or contextual information. Here, the quality and/or availability/coverage of the communications networks at the location of the mobile device 140 can be referred to as "network characteristics" of the communication networks.

Further, the service provider can be configured to generate network coverage maps and/or improve previously generated network coverage maps based on the provided network and/or contextual information, and/or on the quality and/or coverage information determined from the provided network and/or contextual information. Moreover, the mobile device 140 can be configured to perform inter-system offloading to one or more other communication networks based on the crowdsourced network information and/or contextual information of the mobile device 140.

Figure 6:
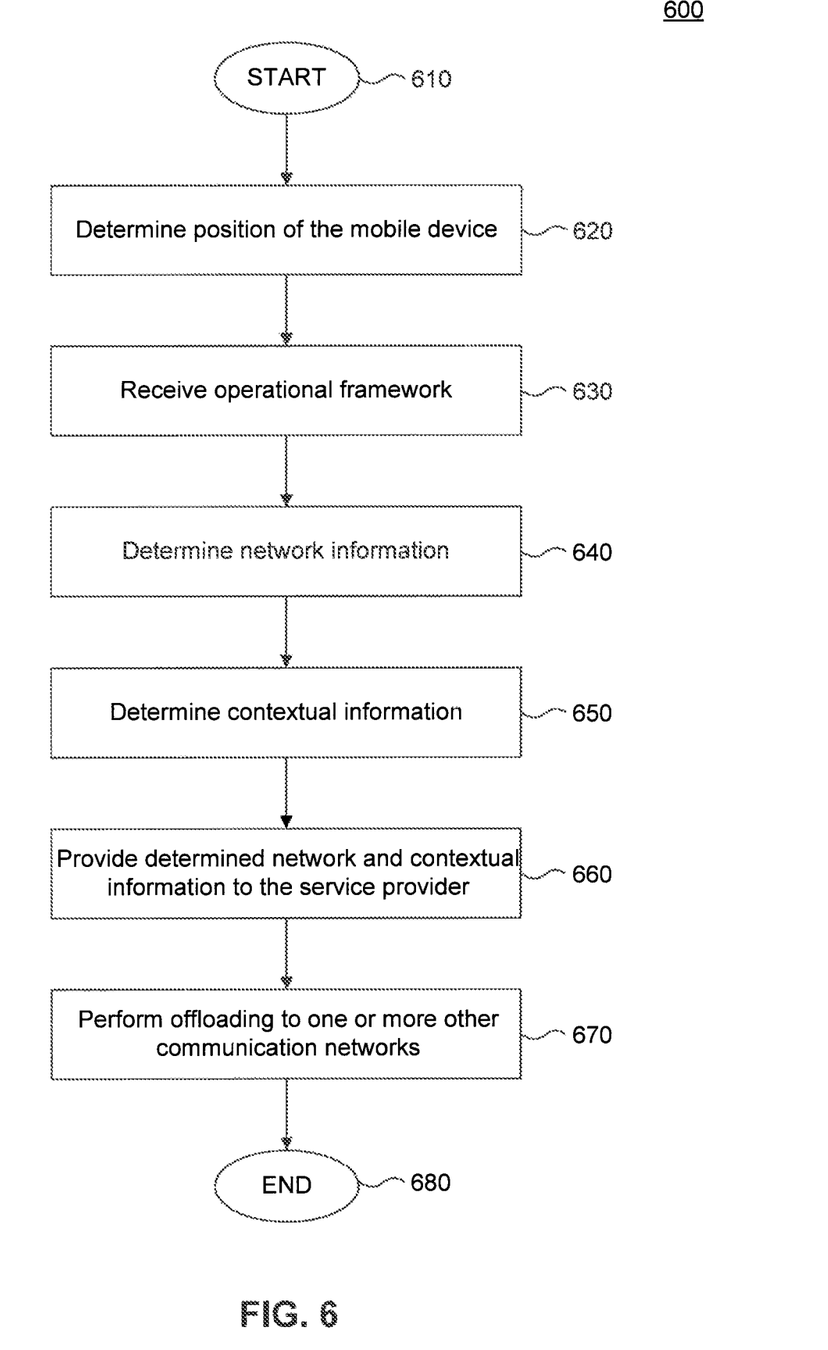
FIG. 6 illustrates a flowchart of an crowdsourcing method according to an exemplary embodiment of the present disclosure.

FIG. 6 illustrates a flowchart 600 of a crowdsourcing method in accordance with an exemplary embodiment of the present disclosure. The method of flowchart 600 is described with continued reference to FIGS. 1-5. The steps of the method of flowchart 600 are not limited to the order described below, and the various steps may be performed in a different order. Further, two or more steps of the method of flowchart 600 may be performed simultaneously with each other.

The method of flowchart 600 begins at step 610 and transitions to step 620, where the mobile device 140 determines the position of the mobile device 140. In an exemplary embodiment, the mobile device 140 is configured to determine the position of the mobile device 140 using one or more positional and/or movement sensors 470 (e.g., GPS, accelerometer, gyroscope sensor, etc.) implemented in (and/or in communication with) the mobile device 140, and/or using one or more positional determinations using signal characteristics relative to one or more base stations and/or access points.

After step 620, the flowchart 600 transitions to step 630, where the mobile device 140 receives an operational framework from the service provider associated with the mobile device 140. In exemplary embodiment, the operational framework provided to the mobile device 140 is determined based on the determined position of the mobile device 140. That is, the operational framework provided to the mobile device 140 includes connection information for one or more communication networks that may be visible to the mobile device 140 at the mobile device's 140 current location in which the mobile device 140 may establish a connection. Further, in an exemplary embodiment, the operational framework is associated with the Access Network Discovery and Selection Function (ANDSF) framework.

After step 630, the flowchart 600 transitions to step 640, where the mobile device 140 determines network information of one or more other communication networks (e.g., WLAN network of the AP 150). In an exemplary embodiment, the network information includes, for example, signal strength and/or interference measurements of the communication network, network visibility information, supported and/or current data rates of the network(s), quality of service (QoS) information of the network(s), network identification information and/or network type, and/or any other network parameter and/or validity condition as would be understood by those skilled in the relevant art(s). The network information which is to be determined can be defined by the operational framework.

After step 640, the flowchart 600 transitions to step 650, where the mobile device 140 determines contextual information associated with the mobile device 140. In an exemplary embodiment, the contextual information includes, for example, the time as reported by the operating system of the mobile device 140, the location of the mobile device 140, the movement of the mobile device 140, the model and/or type of the mobile device 140, information regarding the capabilities of the mobile device 140, information regarding one or more components implemented in the mobile device 140, power management information (e.g., remaining battery power, charging status, etc.) of the mobile device 140, and/or any other environmental information associated with the mobile device 140 as will be apparent to those of ordinary skill in the relevant art(s). The contextual information which is to be determined can be defined by the operational framework.

After step 650, the flowchart 600 transitions to step 660, where the mobile device 140 provides the determined network information and contextual information to the service provider utilizing one or more 3GPP access networks (e.g., LTE network) and/or non-3GPP access networks (e.g., WLAN network). The service provider can be configured to determine network characteristics and/or network coverage maps based on the received network and/or contextual information.

After step 660, the flowchart 600 transitions to step 670, where the mobile device 140 performs inter-system offloading of communications with the current communication network to one or more other communication networks. In an exemplary embodiment, the offloading is based on the determined network information and/or contextual information. For example, the mobile device 140 can determine whether to offload communications to one or more other communication networks based on the network information and/or contextual information, and/or on one or more inter-system offloading policies generated by the service provider based on the network information and/or contextual information.

After step 670, the flowchart 600 transitions to step 680, where the flowchart 600 ends. Here, the flowchart 600 may return to step 610 to repeat the crowdsourcing method.

Figure 7:
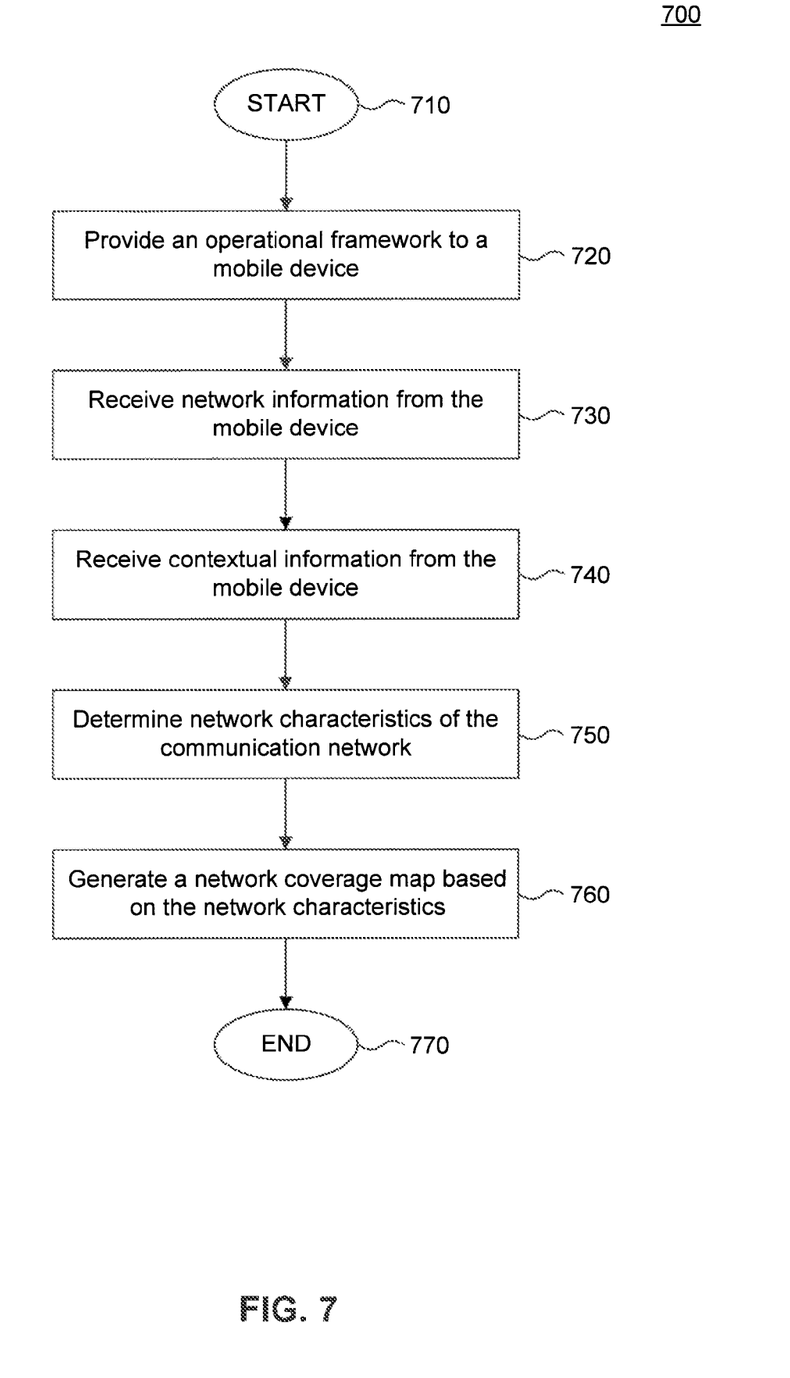
FIG. 7 illustrates a flowchart of an crowdsourcing method according to an exemplary embodiment of the present disclosure The embodiments of the present disclosure will be described with reference to the accompanying drawings. The drawing in which an element first appears is typically indicated by the leftmost digit(s) in the corresponding reference number.

FIG. 7 illustrates a flowchart 700 of a crowdsourcing method in accordance with an exemplary embodiment of the present disclosure. The method of flowchart 700 is described with continued reference to FIGS. 1-6. The steps of the method of flowchart 700 are not limited to the order described below, and the various steps may be performed in a different order. Further, two or more steps of the method of flowchart 700 may be performed simultaneously with each other.

The method of flowchart 700 begins at step 710 and transitions to step 720, where the service provider provides an operational framework to the mobile device 140 via one or more 3GPP access networks (e.g., LTE network) and/or non-3GPP access networks (e.g., WLAN network). In an exemplary embodiment, the operational framework provided to the mobile device 140 is determined based on the position of the mobile device 140. Further, in an exemplary embodiment, the operational framework is associated with the Access Network Discovery and Selection Function (ANDSF) framework.

After step 720, the flowchart 700 transitions to step 730, where the service provider receives network information of one or more other communication networks (e.g., WLAN network of the AP 150) from the mobile device 140. In an exemplary embodiment, the network information includes, for example, signal strength and/or interference measurements of the communication network, network visibility information, supported and/or current data rates of the network(s), quality of service (QoS) information of the network(s), network identification information and/or network type, and/or any other network parameter and/or validity condition as would be understood by those skilled in the relevant art(s). Further, the network information can be defined by the operational framework.

After step 730, the flowchart 700 transitions to step 740, where the service provider receives contextual information of the mobile device 140 from the mobile device 140. In an exemplary embodiment, the contextual information includes, for example, the time as reported by the operating system of the mobile device 140, the location of the mobile device 140, the movement of the mobile device 140, the model and/or type of the mobile device 140, information regarding the capabilities of the mobile device 140, information regarding one or more components implemented in the mobile device 140, power management information (e.g., remaining battery power, charging status, etc.) of the mobile device 140, and/or any other environmental information associated with the mobile device 140 as will be apparent to those of ordinary skill in the relevant art(s). The contextual information can be defined by the operational framework.

After step 740, the flowchart 700 transitions to step 750, where the service provider determines network characteristics of the other communication network. In an exemplary embodiment, the network characteristics are determined based on the received network information and/or the received contextual information. Here, the network characteristics define the availability and/or the quality/coverage of the communication network(s) at the location of the mobile device 140.

After step 750, the flowchart 700 transitions to step 760, where the service provider generates one or more network coverage maps and/or improves one or more previously generated network coverage maps. In an exemplary embodiment, the generation and/or improvement of the network coverage maps is based on the network characteristics, and/or on the network information and/or contextual information.

After step 760, the flowchart 700 transitions to step 770, where the flowchart 700 ends. Here, the flowchart 700 may return to step 710 to repeat the crowdsourcing method.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the invention. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
a first transceiver configured to communicate with a first communication network;
a second transceiver configured to communicate with a second communication network; and
a controller configured to:
receive an operational framework via the first communication network;
determine network information corresponding to the second communication network;
determine contextual information corresponding to the communication device;
provide the network information and the contextual information to a service provider of the communication device; and
determine whether to offload a communication from the first communication network to the second communication network based on information received from the service provider that is generated based on the network information and the contextual information,
wherein the network information and the contextual information are determined based on a plurality of parameters defined in the operational framework.

2. The communication device of claim 1, wherein the operational framework is associated with an Access Network Discovery and Selection Function (ANDSF) framework.

3. The communication device of claim 1, wherein the plurality of parameters include a device parameter associated with the communication device and a network parameter associated with the second communication network.

4. The communication device of claim 1, wherein a parameter of the plurality of parameters associated with the contextual information includes movement information of the communication device or model information of the communication device.

5. The communication device of claim 1, wherein a parameter of the plurality of parameters associated with the network information includes a received signal strength indication (RSSI) value or a signal-to-interference-plus-noise ratio (SINR) value for the second communication network.

6. The communication device of claim 1, wherein a parameter of the plurality of parameters associated with the network information defines a time duration in which the second communication network is visible to the communication device or a time duration in which the second communication network has previously been visible to the communication device.

7. The communication device of claim 1, wherein a parameter of the plurality of parameters associated with the network information defines a data rate of the second communication network or a channel utilization of the second communication network.

8. The communication device of claim 1, wherein a parameter of the plurality of parameters associated with the network information includes quality of service (QoS) information of the second communication network.

9. The communication device of claim 1, wherein a parameter of the plurality of parameters associated with the network information includes identification information that identifies a service provider of the second communication network, an access type of the second communication network, or a venue in which the second communication network is deployed.

10. The communication device of claim 1, wherein the first communication network is a 3rd Generation Partnership Project (3GPP) communication network and the second communication network is a non-3GPP communication network.

11. The communication device of claim 1, wherein the information received from the service provider includes an offloading policy generated based on the network information and the contextual information provided by the communication device.

12. A method for communicating by a communication device, the method comprising:
receiving an operational framework via a first communication network, the operational framework defining a plurality of parameters;
determining network information corresponding to a second communication network;
determining contextual information corresponding to the communication device, wherein the network information and the contextual information are determined based on the plurality of parameters;
providing the network information and the contextual information to a service provider of the communication device; and
determining whether to offload a communication from the first communication network to the second communication network based on information received from the service provider that is generated based on the network information and the contextual information.

13. The method of claim 12, further comprising:
determining a position of the communication device, wherein the operational framework is determined based on the determined position of the communication device.

14. The method of claim 12, wherein the operational framework is associated with an Access Network Discovery and Selection Function (ANDSF) framework.

15. The method of claim 12, wherein the plurality of parameters include a device parameter associated with the communication device and a network parameter associated with the second communication network.

16. The method of claim 12, wherein the information received from the service provider includes an offloading policy generated based on the network information and the contextual information provided by the communication device.

17. A method for communicating with a communication device, the method comprising:
 providing an operational framework to the communication device via a first communication network, the operational framework defining a plurality of parameters;
 receiving network information corresponding to a second communication network from the communication device;
 receiving contextual information corresponding to the communication device from the communication device, wherein the network information and the contextual information are associated with the operational framework; and
 generating a network coverage map based on the received network information and the received contextual information.

18. The method of claim 17, wherein the network coverage map defines a quality and a coverage of the second communication network.

19. The method of claim 17, wherein the plurality of parameters include a device parameter associated with the communication device and a network parameter associated with the second communication network.

20. The method of claim 17, wherein the operational framework is associated with an Access Network Discovery and Selection Function (ANDSF) framework.

21. The method of claim 17, wherein the first communication network is a 3rd Generation Partnership Project (3GPP) communication network and the second communication network is a non-3GPP communication network.

* * * * *